(12) United States Patent
Andre

(10) Patent No.: US 8,225,711 B1
(45) Date of Patent: Jul. 24, 2012

(54) SELF-CONTAINED SINGLE-SERVE BEVERAGE BREWING SYSTEM

(76) Inventor: Richard Anthony Andre, Brookline, MA (US)

( * ) Notice: Subject to any disclaimer, the term of this patent is extended or adjusted under 35 U.S.C. 154(b) by 682 days.

(21) Appl. No.: 12/455,453

(22) Filed: Jun. 2, 2009

Related U.S. Application Data

(60) Provisional application No. 61/058,297, filed on Jun. 3, 2008.

(51) Int. Cl.
*A47J 31/057* (2006.01)

(52) U.S. Cl. ............... 99/304; 99/295; 99/317; 99/322; 99/323; 99/323.3

(58) Field of Classification Search ............... 99/323.3, 99/323, 295, 317, 322, 304
See application file for complete search history.

(56) References Cited

U.S. PATENT DOCUMENTS

| | | | |
|---|---|---|---|
| 2,899,310 A | 8/1959 | Dale | |
| 4,027,582 A | 6/1977 | O'Connell | |
| 4,039,435 A | 8/1977 | Narva | |
| 4,417,504 A | 11/1983 | Yamamoto | |
| 4,627,334 A | 12/1986 | Shanklin | |
| 4,715,271 A | 12/1987 | Kitagawa | |
| 5,243,164 A * | 9/1993 | Erickson et al. | 219/689 |
| 5,424,083 A | 6/1995 | Lozito | |
| 5,503,289 A | 4/1996 | Fox | |
| 5,738,786 A | 4/1998 | Winnington-Ingram | |
| 5,937,737 A | 8/1999 | Karell | |
| 6,038,963 A | 3/2000 | Patterson et al. | |
| 6,065,609 A | 5/2000 | Lake | |
| 6,076,450 A * | 6/2000 | DiGiorgio, Jr. | 99/298 |
| 6,229,128 B1 * | 5/2001 | Policappelli | 219/689 |
| 6,298,771 B1 | 10/2001 | Calvento | |
| 6,374,726 B1 * | 4/2002 | Melton | 99/323 |
| 6,561,080 B1 * | 5/2003 | Feeney | 99/319 |
| 6,715,616 B2 | 4/2004 | Kataoka | |
| 6,758,130 B2 | 7/2004 | Sargent et al. | |
| 6,844,015 B2 | 1/2005 | Yuguchi | |
| 7,128,934 B1 | 10/2006 | Ohta et al. | |

* cited by examiner

*Primary Examiner* — Benjamin Layno

(57) ABSTRACT

This invention fresh brews a single cup of coffee or other hot beverage without measuring, preparation or cleanup and without the need for stand-alone coffee-making devices. It can be dispensed individually from existing vending machines in remote areas or purchased in multi-packs for home or workplace use. The invention stores the ingredients, fresh brews the beverage, becomes a travel mug for consumption, and is disposable. The consumer places the invention in a microwave oven to heat the self-contained water to the proper brewing temperature. The heated water "melts away" or splits the temperature-sensitive membrane, enters the brewing chamber, seeps through the charge of beverage making material, and drips into the outer cup. When the brewing is done the consumer shakes the container to mix the enclosed ingredients, pops open the lid, and enjoys a freshly brewed single serving of hot beverage.

4 Claims, 2 Drawing Sheets

SELF-CONTAINED SINGLE-SERVE BEVERAGE BREWING SYSTEM

CROSS REFERENCE TO RELATED APPLICATIONS

This application claims the benefit of PPA Ser. No. 61/058,297 filed 2008 Jun. 3 by the present inventor, the entire contents of which is incorporated herein by reference.

FEDERALLY SPONSORED RESEARCH

Not applicable

SEQUENCE LISTING OR PROGRAM

Not applicable

FIELD OF INVENTION

This invention relates to hot beverage brewing systems, such as but not limited to those used to brew coffee, specifically to such a system that is fully self-contained and disposable.

BACKGROUND OF INVENTION

Although there are several types of hot beverage brewing systems on the market today, none are totally self-contained, utilize a simple one-step brewing process, and are completely disposable. Presently the brewing of hot beverages, such as coffee, requires the storage and use of fresh water, ground coffee or other drink-making material, measuring scoops, coffee filters, sugar or sweeteners, cream or milk (creating the need for refrigeration), coffee cups and lids, and drink stirrers or spoons. Furthermore, some type of stand-alone mechanical brewing device is necessary to facilitate the brewing process, such as a percolator or drip coffee maker.

Added to the brewing process is the messy and unwanted tasks of discarding the used coffee grounds and spent materials, cleaning the food preparation areas and coffee pot, and the thorough cleaning and maintenance of the beverage brewing device. These tasks often go undone in many offices, employee lounge areas, and office waiting rooms leaving messy, unsanitary, and unsightly conditions.

It is important to note that coffee is considered stale and the taste deteriorates if it sits in a coffee pot for more than twenty minutes. This is a costly problem for many businesses since much stale coffee is discarded and a fresh pot must be made frequently. Therefore there is the constant waste of coffee and all of the required paraphernalia, which is not only costly but environmentally harmful. There have also been documented cases of extensive damage caused by unattended coffee makers that have been carelessly left on for several hours resulting in the overheating of the brewing machines which subsequently have caught fire.

Where there is no water supply available, the brewing of hot beverages is presently not possible. Also, it is necessary to provide refrigeration for milk and/or cream to accompany the brewed beverages. Furthermore, the commercial brewing of hot beverages such as coffee, requires compliance with federal food handling regulations that require a conforming food preparation area with a water supply. This has resulted in the prohibition of commercial sales of coffee, and other hot beverages, in many cases such as from pushcarts, onboard intercity buses, onboard many passenger trains, and commuter boats.

BACKGROUND OF INVENTION

Objects and Advantages

The present invention is a self-contained single-serve beverage brewing system that consists of the following items: a lid; an outer cup; an inner water reservoir with a pre-measured water supply; a temperature-sensitive membrane; an inner brew chamber containing a packet consisting of a pre-measured charge of beverage-making material, such as ground coffee, tea, cocoa, bouillon or the like, wrapped in a filter material; and a drip spout.

These elements are connected as follows: the lid is attached to the inner water reservoir/brewer, the temperature sensitive membrane is attached to the inside bottom of the water reservoir between the water supply and the brew chamber to separate the water from the beverage-making material charge, the beverage-making material charge is wrapped within a filter material and attached within the brew chamber below the temperature-sensitive membrane and above the drip spout. Attached below the brewing chamber and within the bottom of the reservoir/brewer is the drip spout consisting of a conically shaped chamber with radiating raised ribs to support the beverage-making material charge, and a discharge hole in the bottom.

It should be further noted that one side of the inner water reservoir is flat to act as a chute or passageway for the brewed beverage to pass from the bottom of the outer cup to the cup's drinking lip when the cup is tipped for consumption.

It should be further noted that the lid can be made of various materials, such as but not limited to plastic or lined paper or a combination of such, but preferably an eco-friendly bio-degradable product; the outer cup can be made of various materials, such as but not limited to plastic, Styrofoam, or lined paper, but preferably an eco-friendly bio-degradable product; the inner water reservoir/brewer, brew chamber, and drip spout can be made of various materials, such as but not limited to plastic or lined paper or a combination of such, but preferably an eco-friendly bio-degradable product; and the temperature-sensitive membrane can be made of various materials, such as but not limited to a polymer, thermoplastic, or lined paper that "melts away" or splits open when the water in the reservoir reaches the proper brewing temperature (approximately 200 degrees Fahrenheit for coffee); and the pre-measured beverage-making charge is made of ground coffee, or other drink-making material, which is sealed in a filter wrapper.

The lid is attached to the reservoir/brewer by various means, such as but not limited to the use of various adhesives to seal the two together to prevent leakage of the water supply. The combined lid and reservoir/brewer attaches to the outer cup by various means such as but not limited to various adhesives or friction.

DESCRIPTION OF USE

The invention is a completely self-contained beverage brewing machine capable of fresh brewing a serving of hot coffee, or other hot beverage, without the need to add any other ingredient and without the need to use any type of stand alone coffee making device.

The invention can be purchased individually through vending machines or in multi-packs for home, workplace, waiting room, and commercial use. The invention is placed in a microwave oven to complete the brewing process. Vending machines built exclusively to dispense the invention, can be equipped with mini-microwave ovens for this purpose.

The preparer puts the invention in a microwave oven and heats the water in the inner reservoir to the proper brewing temperature, approximately 200 degrees Fahrenheit for coffee. When the water reaches the proper temperature, the temperature-sensitive membrane "melts-away" or splits open to allow the hot water to enter the brewing chamber. The heated water passes into the brewing chamber and saturates the charge of beverage-making material activating the brewing process. The brewed beverage drips down through the drip spout and collects into the outer cup.

The consumer then removes the invention from the microwave oven and shakes or swirls the entire invention to mix all of the ingredients together. The consumer will then open the pop-top lid and drink the beverage immediately or take it with them in the car, bus, or train and consume the beverage on the way to work or elsewhere. Once the brewed beverage is consumed, the entire invention is discarded.

The consumer gets a freshly brewed cup of coffee or other hot beverage in minutes without the need to stock, measure or assemble any ingredients and with absolutely no cleanup necessary. The consumer no longer has to take the time to assemble the ingredients and mechanical parts necessary to prepare a cup of coffee or other hot beverage at home, or fight for a parking space and wait in long lines at the local coffee shop to purchase their morning beverage on the way to work. The invention is a real time saver easing the average consumer's hectic morning routine. Also different beverages would be available for different family members who desire other types of hot drinks instead of the present need to make an entire pot of a certain type of coffee which may go mostly unused.

The lower half of the outer cup can contain various ingredients customary added to hot beverages such as but not limited to ultra-pasteurized cream that requires no refrigeration, sugar or sweeteners, or various flavorings. Therefore the invention can be sold in many versions depending on the consumer's preference. Examples of this are: black coffee, decaffeinated coffee with cream, hazelnut flavored coffee with cream and sugar, vanilla flavored coffee with cream and Splenda, etc. The possible combinations are numerous.

It should be further noted that by using the invention, businesses can offer their workers and clients a way to have hot coffee or other hot beverage, without the need to purchase and store coffee, cream, sweeteners, filters, cups, lids, and stirrers, without the need for water, without the mess of coffee preparation and disposal of used grounds and paraphernalia, and without the unwanted necessity of cleaning coffee pots and coffee making machines.

It should be further noted that the invention will allow the commercial sale of hot coffee and other hot beverages, without the need for a federally approved food preparation area that is subject to restricting food handling regulations. This will permit the sale of hot coffee and other hot beverages, in places with no water supply, or limited physical space such as from pushcarts, onboard intercity buses, onboard many passenger trains, and commuter boats.

The invention can have built-in temperature-sensitive indicators on the outside to notify the consumer when the water has reached the proper brewing temperature, when the beverage is brewing, and when the beverage has completed the brewing process and is ready for consumption.

In an alternative embodiment, the invention can consist of the lid and a slightly tapered reservoir brewer that can be inserted into existing hot beverage cups eliminating the outer cup illustrated on the drawings. This version can attach to the lip of existing hot beverage cups by friction and be used in the same manner to brew hot beverages.

The invention is primarily a single-serve coffee brewing device, but can also be used to brew teas, hot cocoa, hot apple cider, soup broths, and the like, depending on the drink product being used in the filter wrapped charge.

The invention can be sold individually in the field or in various public places through vending machines, or sold in multi-packs at supermarkets for use in the home or workplace. The invention can be sold through exclusive product branded vending machines that have a mini-microwave oven built in just for the purpose of brewing the beverage. For instance, a consumer could purchase Folger's coffee sold in a six-pack at the supermarket to brew at home, or purchase individual units through a Folger's vending machine which would dispense various varieties of Folger's coffee and contain a small microwave oven for brewing the coffee. This corporate product-branded vending machine model creates an entirely new channel through which coffee companies can market their product to the public.

Accordingly, several objects and advantages of the self-contained single-serve beverage brewing system described above, several objects and advantages of the present invention are:

a) to provide the brewing of coffee or other hot beverages without the need to purchase, store, and use fresh water, ground coffee, coffee scoops, coffee filters, sweeteners, cream or milk, coffee-cups and lids, and coffee stirrers or spoons.

b) to provide the brewing of coffee or other hot beverages without the need for a water supply.

c) to provide the brewing of coffee or other hot beverages without the need of a stand-alone coffee brewing device.

d) to provide the brewing of coffee or other hot beverages without the need to have a food preparation area, e) to provide the brewing of coffee or other hot beverage without the need to clean a food preparation area, coffee pot, or coffee brewing device, f) to provide the brewing of coffee or other hot beverages without the usual waste that results from the disposal of used coffee grounds, filters, sugar packets, spoons and stirrers.

g) to provide the brewing of coffee or other hot beverages without the need to store and refrigerate cream or milk for adding to the beverage.

h) to provide the brewing of coffee or other hot beverages in offices, hospitals, schools, business waiting areas, and employee lounges without the need for constant tending, preparation, and clean up.

i) to provide the brewing of coffee or other hot beverages in remote areas where the only necessities are a vending machine and microwave oven, or a vending machine with a built-in mini microwave oven purposely built for the dispensing of the invention.

j) to provide the brewing of coffee or other hot beverages in limited physical spaces.

Further objects and advantages of my invention will become apparent from a consideration of the drawings and ensuing description.

SUMMARY

In accordance with the present invention, a self-contained, single-serve, portable, disposable beverage brewing system that freshly brews one serving of hot coffee, or other hot beverage, in an easy one-step process without the need to obtain additional ingredients such as water, coffee, cream, sugar or the like, and without the need for any clean up whatsoever.

DETAILED DESCRIPTION OF DRAWINGS

Figure 1:
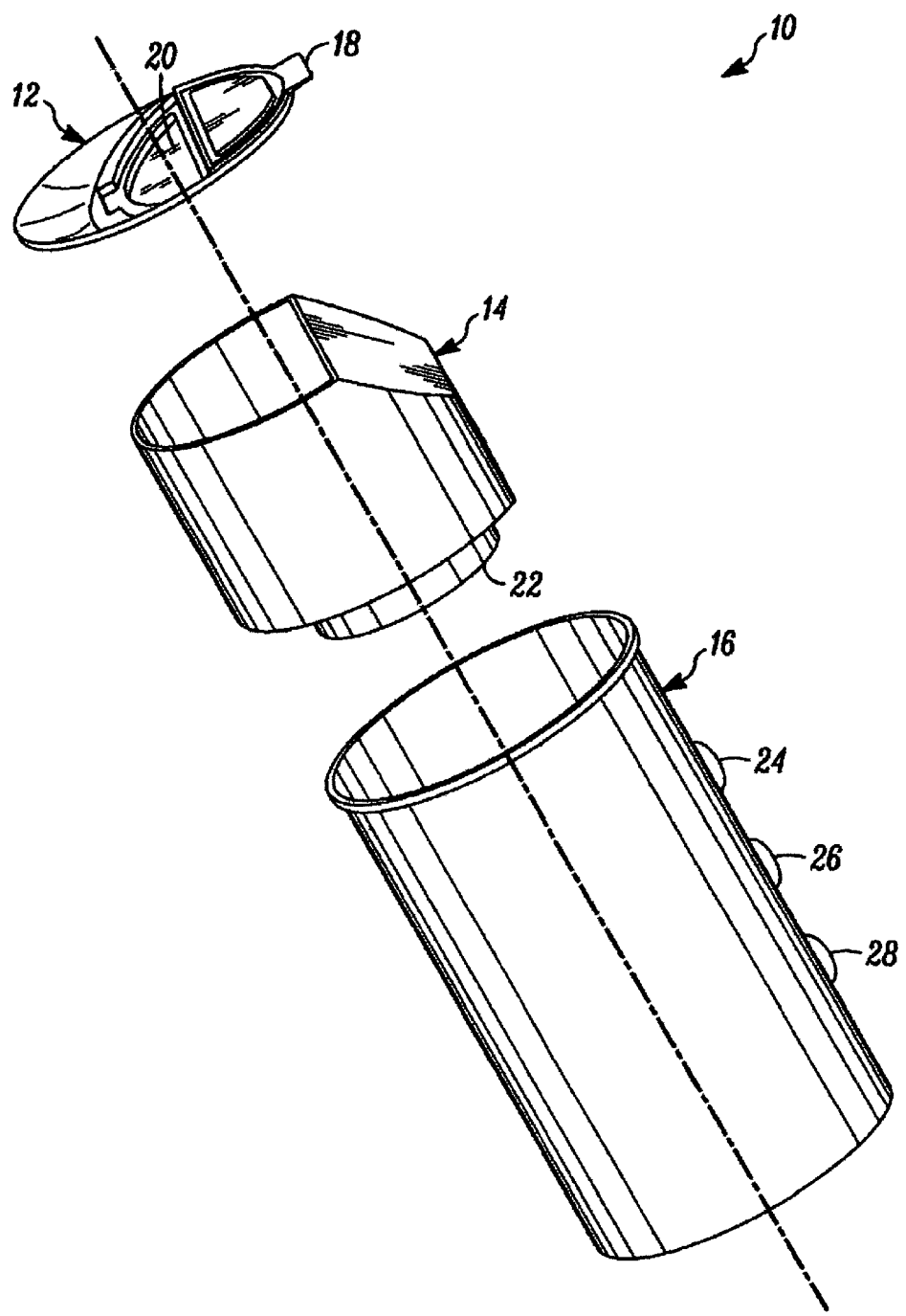
FIG. 1: is the exploded view of the invention showing the lid, the reservoir/brewer, and the outer cup.
Figure 2:
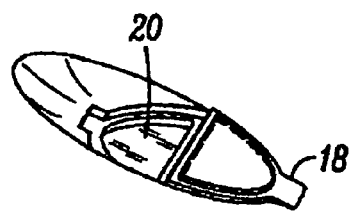
FIG. 2: is the perspective view of the lid of the invention in the closed position.

FIG. 1 shows the exploded view of the self-contained single-serve beverage brewing system. This illustrates the lid (#12) in the closed position, the reservoir/brewer (#14), and the outer cup (#16) with exterior color-coded temperature-sensitive indicators (#24, #26, and #28) to show the brewing process from "STOP HEATING" to "BREWING" to "GOOD TO GO" to alert the consumer about the progress of the brewing process FIG. 2 shows the perspective view of the lid of the self-contained single-serve beverage brewing system in the closed position. The pop-top tab (#18) lifts up, folds over, and snaps down into the "nose indent" (#20) to keep the lid open for drinking. The "nose indent" is intended to offer clearance for the consumer's nose when the cup is tipped for drinking to allow for a more comfortable drinking experience.

Figure 3:
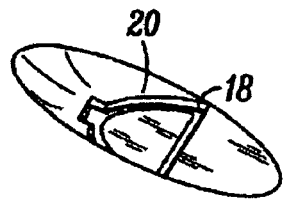
FIG. 3: is the perspective view of the lid of the invention in the open position.

FIG. 3 shows the perspective view of the lid of the self-contained single-serve beverage brewing system in the open position. The pop-top tab (#18) is shown flipped over and snapped down into the "nose indent" (#20) to keep the lid open for drinking.

Figure 4:
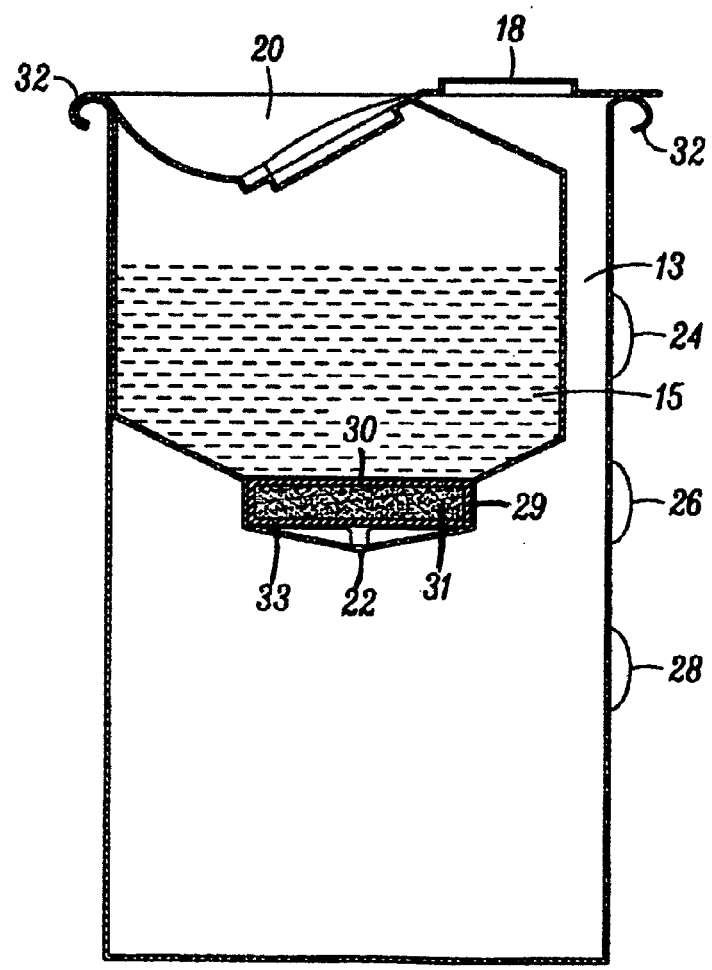
FIG. 4: is the cross-sectional view of the assembled invention showing the orientation of the various parts.

FIG. 4 shows the cross sectional view of the assembled self-contained single-serve beverage brewing system. The lid is shown in the closed position with the pop-top (#18) unopened. The water supply (#15) is shown as dashed lines within the reservoir/brewer. The reservoir/brewer is shown secured within the outer cup. The temperature-sensitive membrane (#30) is shown between the water supply (#15) and the brewing chamber (#29). Within the brewing chamber is the beverage brewing packet (#31) consisting of a pre-measured charge of beverage making material such as, but not limited to, ground coffee, loose tea, cocoa, bouillon, or other drink making material wrapped in a filter material (#33). Below the brew chamber is the drip spout (#22), a conically shaped chamber with radiating raised ribs to support the beverage brewing packet, with a discharge drip hole at its bottom.

DRAWING REFERENCE NUMBERS

10: is the overall view of the invention showing the major components of the lid, reservoir/brewer, and outer cup.
12: is the lid assembly of the invention.
13: is the chute or passageway for the brewed beverage to decant.
14: is the reservoir/brewer containing the water reservoir and brewing chamber which holds the beverage making packet consisting of a pre-measured charge of beverage making product wrapped in a filter material.
15: is the water supply.
16: is the outer cup that stores any desired optional ingredients customary added to hot beverages such as flavorings, ultra-pasteurized cream (requiring no refrigeration), sugar or other sweeteners, and the like, allowing for several variations of the product, and also holds the beverage for consumption after it is brewed.
18: is the tab on the "pop-top" lid.
20: is the "nose indent" that receives and holds the "pop-top" when the lid is open and also allows clearance for the drinker's nose for a more comfortable drinking experience.
22: is the drip spout where the brewed beverage exits the brewing chamber to collect in the outer cup below.
24: is the "STOP HEATING" red-colored temperature-sensitive indicator that senses that the water supply has reached the desired brewing temperature and will start to melt the temperature-sensitive membrane to start the brewing process. This is to alert the consumer to turn off the microwave oven.
26: is the "BREWING" yellow-colored temperature-sensitive indicator that senses that the hot water has entered the brewing chamber and the brewing of the beverage has begun. This is to alert the consumer that the beverage is in the brewing process and is not yet ready for consumption.
28: is the "GOOD TO GO" green-colored temperature-sensitive indicator that senses that the beverage has filled the outer cup and is ready for consumption. This is to alert the consumer that the beverage has completed the brewing process and is ready for consumption.
29: is the brewing chamber that holds the brewing packet that contains a pre-measured charge of beverage brewing material.
30: is the temperature-sensitive membrane that when intact, separates the water supply from the beverage brewing packet. This membrane "melts-away" or splits when the water in the above reservoir reaches the proper brewing temperature (e.g., 200 degrees Fahrenheit for coffee).
31: is the beverage brewing packet that contains a pre-measured charge of ground coffee, loose tea, cocoa powder, bouillon powder, or other beverage brewing material.
32: is the top lip of the outer cup.
33: is the filter material that encloses the brewing charge While the present invention has been described in terms of specific embodiments, it is to be understood that the invention is not limited to these disclosed embodiments. This invention may be embodied in many different forms and should not be construed as limited to the embodiments set forth herein; rather, these embodiments are provided by way of illustration only and so that this disclosure will be thorough, complete and will fully convey the full scope of the invention to those skilled in the art. Indeed, many modifications and other embodiments of the invention will come to mind of those skilled in the art to which this invention pertains, and which are intended to be and are covered by both this disclosure, the drawings and the claims.

It should be understood that it is within the scope of this invention to cover the base claim (i.e. claim #1) plus one or more of the various optional limitations added in the dependent claims, which either directly or indirectly depend on claim #1.

I claim:

1. A self-contained single-serve beverage brewing device comprising:
    (a) a lid that seals a reservoir/brewer in a closed position, the lid having a pop-open resealable tab opening that is attached to the top of a reservoir/brewer,
    (b) a reservoir/brewer that comprises a water chamber that contains a pre-measured water supply sealed within the reservoir/brewer, a brewing chamber that contains a pre-measured charge of beverage-making material sealed within the reservoir/brewer, a temperature-sensitive membrane between the water chamber and the brewing chamber that separates the water chamber from the brewing chamber, and a drip spout, (c) an outer cup having an opening at the top that receives and attaches the reservoir/brewer to the outer cup securing the reservoir/brewer within the outer cup, the outer cup becomes the receptacle of the hot beverage after brewing the combined lid, reservoir/brewer and outer cup form, a travel device for transporting the hot beverage, and becomes a vessel from which the consumer consumes the hot beverage.

2. The reservoir/brewer of claim 1 further comprising a brewing chamber that contains a pre-measured charge of a drink-making material such as but not limited to ground coffee, loose tea, powdered cocoa, bouillon, or other like drink-making material wrapped in a filter material.

3. The reservoir/brewer of claim 1 further comprising a temperature-sensitive membrane separating the water in the water reservoir from the brewing chamber, that "melts-away" or splits when the water in the reservoir is heated to the proper brewing temperature, allowing the heated water to enter the brewing chamber to facilitate the brewing process.

4. The reservoir/brewer of claim 1 further comprising a drip spout that is conical in shape, has radiating ribs to support the pre-measured beverage charge, and has a discharge opening on the bottom to dispense the brewed beverage into the outer cup below.

* * * * *